(12) United States Patent
Zhang et al.

(10) Patent No.: US 9,521,628 B2
(45) Date of Patent: *Dec. 13, 2016

(54) CARRIER BEARING METHOD AND DEVICE, AND RADIO REMOTE UNIT

(71) Applicant: Huawei Technologies Co., Ltd., Shenzhen (CN)

(72) Inventors: Shunqing Zhang, Shanghai (CN); Shugong Xu, Shenzhen (CN); Haicun Hang, Shanghai (CN); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 756 days.

This patent is subject to a terminal disclaimer.

(21) Appl. No.: 13/892,758

(22) Filed: May 13, 2013

(65) Prior Publication Data

US 2013/0250856 A1 Sep. 26, 2013

Related U.S. Application Data

(63) Continuation of application No. 13/662,136, filed on Oct. 26, 2012, now Pat. No. 8,462,660, which is a continuation of application No. PCT/CN2011/080202, filed on Sep. 27, 2011.

(30) Foreign Application Priority Data

Jan. 31, 2011 (CN) .......................... 2011 1 0033906

(51) Int. Cl.
*H04L 12/28* (2006.01)
*H04W 52/22* (2009.01)
(Continued)

(52) U.S. Cl.
CPC ......... *H04W 52/228* (2013.01); *H04W 52/226* (2013.01); *H04W 52/346* (2013.01)

(58) Field of Classification Search
USPC ......................... 370/252, 430, 419, 328, 463
See application file for complete search history.

(56) References Cited

U.S. PATENT DOCUMENTS 8,730,786 B2 * 5/2014 Wang ...................... H03F 1/304
370/201
2005/0043053 A1 * 2/2005 Lin ........................ H04W 24/00
455/522
(Continued)

FOREIGN PATENT DOCUMENTS

CN 1859657 A 11/2006
CN 101056129 A 10/2007
(Continued)

OTHER PUBLICATIONS

International Search Report (including English Translation) issued in corresponding PCT Application No. PCT/CN2001/080202; mailed Jan. 5, 2012.
(Continued)

*Primary Examiner* — John Pezzlo
(74) *Attorney, Agent, or Firm* — Brinks Gilson & Lione

(57) ABSTRACT

The present disclosure discloses a carrier bearing method and device, and a base station. The carrier bearing method includes: obtaining transmit power of each carrier borne on all power amplifiers in a radio remote unit after detecting that transmit power of a carrier borne on a power amplifier in the radio remote unit changes; adjusting a correspondence between the carriers and the power amplifier in the radio remote unit according to the obtained transmit power; and bearing each carrier on its corresponding power amplifier according to the adjusted correspondence. The device and base station are used to implement the above method.

10 Claims, 5 Drawing Sheets

(51) Int. Cl.
*H04W 52/34* (2009.01)
*H04J 1/16* (2006.01)

(56) References Cited

U.S. PATENT DOCUMENTS

| | | |
|---|---|---|
| 2007/0280377 A1 | 12/2007 | Rucki |
| 2008/0265996 A1 | 10/2008 | Kim et al. |
| 2015/0382363 A1* | 12/2015 | Wang .................. H04W 24/02 370/329 |

FOREIGN PATENT DOCUMENTS

| | | |
|---|---|---|
| CN | 101083496 A | 12/2007 |
| CN | 101621806 A | 1/2010 |
| EP | 2 075 923 A1 | 7/2009 |
| WO | WO 2010/077191 A1 | 7/2010 |
| WO | WO 2010/095985 A1 | 8/2010 |

OTHER PUBLICATIONS

Partial Translation of the Written Opinion of the International Searching Authority of 83094618PCT02.
Extended European Search Report issued in corresponding European Patent Application No. 11857455.7, mailed Jun. 25, 2013, 7 pages.
Notice of Allowance issued in commonly owned U.S. Appl. No. 13/662,136, mailed Feb. 11, 2013, 9 pages.
Office Action issued in commonly owned U.S. Appl. No. 13/662,136, mailed Jan. 11, 2013, 5 pages.

* cited by examiner

CARRIER BEARING METHOD AND DEVICE, AND RADIO REMOTE UNIT

CROSS-REFERENCE TO RELATED APPLICATIONS

This application is a continuation of U.S. patent application Ser. No. 13/662,136, filed on Oct. 26, 2012, which is a continuation of International Application No. PCT/CN2011/080202, filed on Sep. 27, 2011. The International application claims priority to Chinese Patent Application No. 201110033906.X, filed on Jan. 31, 2011. The afore-mentioned patent applications are hereby incorporated by reference in their entireties.

FIELD

The present disclosure relates to the field of radio communication technologies, and in particular, to a carrier bearing method and device, and a radio remote unit.

BACKGROUND

A base station in a radio communication system generally includes a radio remote unit (Radio Remote Unit, RRU). A radio remote unit may include multiple multi-carrier power amplifiers. Each multi-carrier power amplifier may bear multiple carrier signals to implement power amplification for the carrier signals.

When an existing base station runs, each carrier is borne on the multi-carrier power amplifiers in the radio remote unit and then the signal with amplified power is transmitted.

During research of the prior art, the inventor finds that when the radio remote unit in the prior art bears carriers, it bears the carriers on the corresponding power amplifiers according a preset correspondence between the carriers and the power amplifier. During running of the base station, the preset correspondence is fixed; however, the transmit power of a carrier changes with the impact of the power control, user mobility, and channel change status. In the prior art, proper power amplifiers cannot be flexibly selected for bearing carriers, according to the change of the transmit power of the carriers. The efficiency curve of a power amplifier is generally non linear. This results in low average work efficiency of the power amplifier.

SUMMARY

The present disclosure provides a carrier bearing method and device, and a radio remote unit, to flexibly select a proper power amplifier to bear carriers, according to the transmit power of the carriers.

To solve the above problem, embodiments of the present disclosure provide the following solutions: An embodiment of the present disclosure provides a carrier bearing method. The method includes: obtaining transmit power of each carrier borne on all power amplifiers in a radio remote unit after detecting that transmit power of a carrier borne on a power amplifier in the radio remote unit changes; adjusting a correspondence between the carriers and the power amplifier in the radio remote unit according to the obtained transmit power; and bearing each carrier on its corresponding power amplifier according to the adjusted correspondence.

An embodiment of the present disclosure provides a carrier bearing device. The device includes a carrier power obtaining unit, a correspondence adjusting unit, and a carrier bearing unit. The carrier power obtaining unit is configured to obtain transmit power of each carrier borne on power amplifiers in a radio remote unit after detecting that transmit power of a carrier borne on a power amplifier in the radio remote unit changes. The correspondence adjusting unit is configured to adjust a correspondence between the carriers and the power amplifier in the radio remote unit according to the obtained transmit power. The carrier bearing unit is configured to bear each carrier on its corresponding power amplifier according to the adjusted correspondence.

An embodiment of the present disclosure further provides a base station including the above carrier bearing device.

According to the carrier bearing method and device, and the base station provided in the embodiments of the present disclosure, when the transmit power of a carrier changes, the correspondence in the radio remote unit is adjusted according to the changed transmit power. Compared with the prior art where only one correspondence can be used, the correspondence can be adjusted in the present disclosure according to the change of the transmit power of a carrier, to obtain a proper correspondence between a power amplifier and carriers. In this way, a proper power amplifier may be flexibly selected for bearing, according to the change of the transmit power of the carrier, and the average work efficiency of the power amplifier is improved.

BRIEF DESCRIPTION OF THE DRAWINGS

To make the solutions of the embodiments of the present disclosure clearer, the accompanying drawings for illustrating the embodiments of the present disclosure are briefly described below. Apparently, the accompanying drawings to be described in the following are only about some embodiments of the present disclosure, and persons of ordinary skill in the art can derive other drawings from the accompanying drawings without any creative effort.

DETAILED DESCRIPTION OF THE EMBODIMENTS

The solutions disclosed in the embodiments of the present disclosure are described below with reference to embodiments and accompanying drawings. Evidently, the embodiments are exemplary only, and the present disclosure is not limited to such embodiments. Persons of ordinary skill in the art can derive other embodiments from the embodiments given herein without making any creative effort, and all such embodiments are covered in the scope of the present disclosure.

Embodiments of the present disclosure provide a carrier bearing method and device, and a radio remote unit. To better understand the solutions of the present disclosure, the following describes in detail the embodiments of the present disclosure with reference to accompanying drawings.

Figure 1:
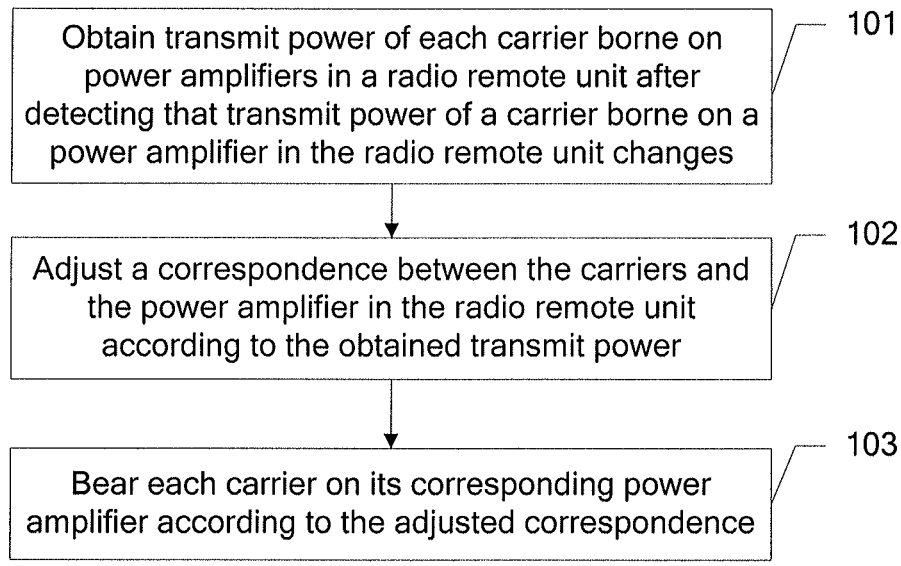
FIG. 1 is a flowchart of a carrier bearing method according to a first embodiment of the present disclosure.

Referring to FIG. 1, a flowchart of a carrier bearing method according to a first embodiment of the present disclosure is illustrated.

The carrier bearing method according to the first embodiment of the present disclosure includes the following steps:

101. Obtain transmit power of each carrier borne on power amplifiers in a radio remote unit if detecting that transmit power of a carrier borne on a power amplifier in the radio remote unit changes.

Specifically, the transmit power of the carrier borne on the power amplifier in the radio remote unit changes with impact of power control, user mobility, and channel status. According to the embodiments of the present disclosure, a carrier bearing device obtains the current transmit power of each carrier borne on the power amplifiers in the radio remote unit after detecting that the transmit power changes.

102. Adjust a correspondence between the carriers and the power amplifier in the radio remote unit according to the obtained transmit power.

Specifically, the carrier bearing device may adjust an initial correspondence in the radio remote unit according to the obtained transmit power. The initial correspondence is an initially set correspondence between the power amplifier and the carriers. When bearing a carrier for the first time, the radio remote unit bears the carrier on a corresponding power amplifier according to the above initial correspondence. In actual applications, the current correspondence between the carriers and the power amplifier may also be used as the initial correspondence. That is, the current correspondence is adjusted to implement dynamic adjustment of the correspondence between the carriers and the power amplifier during applications. Alternatively, it may also be considered that during the dynamic adjustment of the correspondence between the carriers and the power amplifier, a first adjusted correspondence is the initial correspondence.

103. Bear each carrier on its corresponding power amplifier according to the adjusted correspondence.

Specifically, the carrier bearing device bears each carrier on its corresponding power amplifier according to the adjusted correspondence.

According to the carrier bearing method provided in the embodiments of the present disclosure, when the transmit power of a carrier changes, the correspondence in the radio remote unit is adjusted according to the changed transmit power. Compared with the prior art where only one correspondence can be used, the correspondence can be adjusted according to the change of the transmit power of a carrier to obtain a proper correspondence between a power amplifier and carriers in the present disclosure. In this way, a proper power amplifier may be flexibly selected for bearing a carrier, according to the change of the transmit power of the carrier, and the average work efficiency of the power amplifier is improved.

Further, in the first embodiment of the present disclosure, during adjustment of the correspondence, the total input power P1 required by all power amplifiers in the radio remote unit under the adjusted correspondence is smaller than the total input power P2 required by all power amplifiers under the correspondence. The carrier bearing device may obtain the total input power required by all power amplifiers under the correspondence and multiple different adjusted correspondences, and select a correspondence corresponding to the total input power that is smaller than P1. The carrier bearing device bears each carrier on its corresponding power amplifier according to the adjusted correspondence, which improves the average work efficiency of each power amplifier.

Further, in the first embodiment of the present disclosure, when the correspondence is adjusted according to the obtained transmit power, the total input power required by all power amplifiers in the radio remote unit under the adjusted correspondence can be minimized. Therefore, after the carriers are borne on the corresponding power amplifiers according to the adjusted correspondence, as compared with other bearing manners, the average work efficiency of the power amplifiers in the radio remote unit is the highest.

Figure 2:
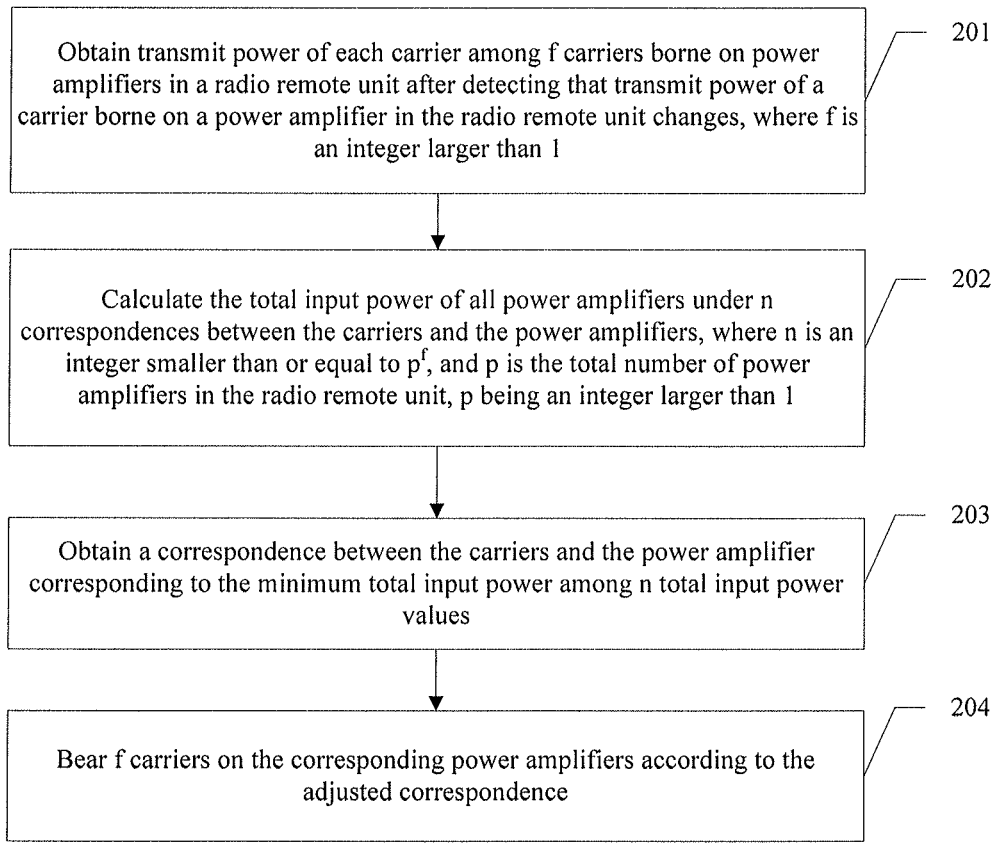
FIG. 2 is a flowchart of a carrier bearing method according to a second embodiment of the present disclosure.

Referring to FIG. 2, a flowchart of a carrier bearing method according to a second embodiment of the present disclosure is illustrated.

In this embodiment of the present disclosure, multiple carriers need to be borne on the power amplifiers in an RRU. The transmit power of a carrier may change with impact of power control, user mobility, and a channel change status. The carrier bearing method according to the second embodiment of the present disclosure includes the following steps:

201. Obtain transmit power of each carrier among f carriers borne on power amplifiers in a radio remote unit after detecting that transmit power of a carrier borne on a power amplifier in the radio remote unit changes, where f is an integer larger than 1.

Specifically, the total number of carriers required to be borne on the power amplifiers is f, where f is an integer larger than 1. A carrier bearing device obtains the transmit power of each carrier after detecting that the transmit power of a carrier changes.

202. Calculate the total input power of all power amplifiers under each of n correspondences between the carriers and the power amplifiers, where n is an integer smaller than or equal to pf, and p is the total number of power amplifiers in the radio remote unit and p is an integer larger than 1.

Specifically, the carrier bearing device determines n correspondences between the carriers and the power amplifiers for f carriers, and calculates the total input power of all power amplifiers under each correspondence according to the efficiency curve of a power amplifier.

The efficiency curve of a power amplifier is a correspondence between the output power of the power amplifier and the work efficiency of the power amplifier. In this embodiment of the present disclosure, the sum of the power required for bearing carriers on the power amplifier is output power of the power amplifier. The output power of the power amplifier may be calculated according to the efficiency curve and output power of the power amplifier.

203. Obtain a correspondence that is between the carriers and the power amplifier and is corresponding to the minimum total input power among n total input power values.

Specifically, the carrier bearing device selects a correspondence that is between the carriers and the power amplifier and is corresponding to the minimum value of n total input power values. The correspondence is the adjusted correspondence.

204. Bear f carriers on the corresponding power amplifiers according to the adjusted correspondence.

Specifically, the carrier bearing device bears each carrier on its corresponding power amplifier according to the selected correspondence between the carriers and the power amplifier.

According to the carrier bearing method provided in the second embodiment of the present disclosure, the total input power required by all power amplifiers under all available correspondences is calculated, and a correspondence corresponding to the minimum total input power value is selected. Under the selected correspondence, the total input power required by the power amplifiers in the radio remote unit can be the minimum. Compared with the prior art where only one correspondence can be used, a proper correspondence can be obtained according to the transmit power of multiple carriers required to be borne in the present disclosure, so that a proper power amplifier may be flexibly selected for bearing a carrier, according to the change of the power of the carrier. In this way, the required total input power is the minimum and the average work efficiency of the power amplifier is high.

Further, in the method provided in the second embodiment of the present disclosure, traverse times n may be simplified according to the features of the power amplifiers in the RRU. For example, the carrier bearing device may obtain the minimum number m of the power amplifiers required for bearing f carriers, according to the maximum output power of a power amplifier or the maximum number of carriers on a power amplifier, and then calculate the total input power of all amplifiers under each of mf correspondences between the carriers and the power amplifiers to obtain a correspondence that is between the carriers and the power amplifier and is corresponding to the minimum total input power value among mf total input power values. Compared with the calculation of total pf input power values in the second embodiment, implementation complexity is reduced. According to the features of the RRU (for example, a main B carrier must be borne on a first power amplifier), the carrier bearing device may further reduce the number of total input power values required to be calculated, so as to further reduce the implementation complexity.

Figure 3:
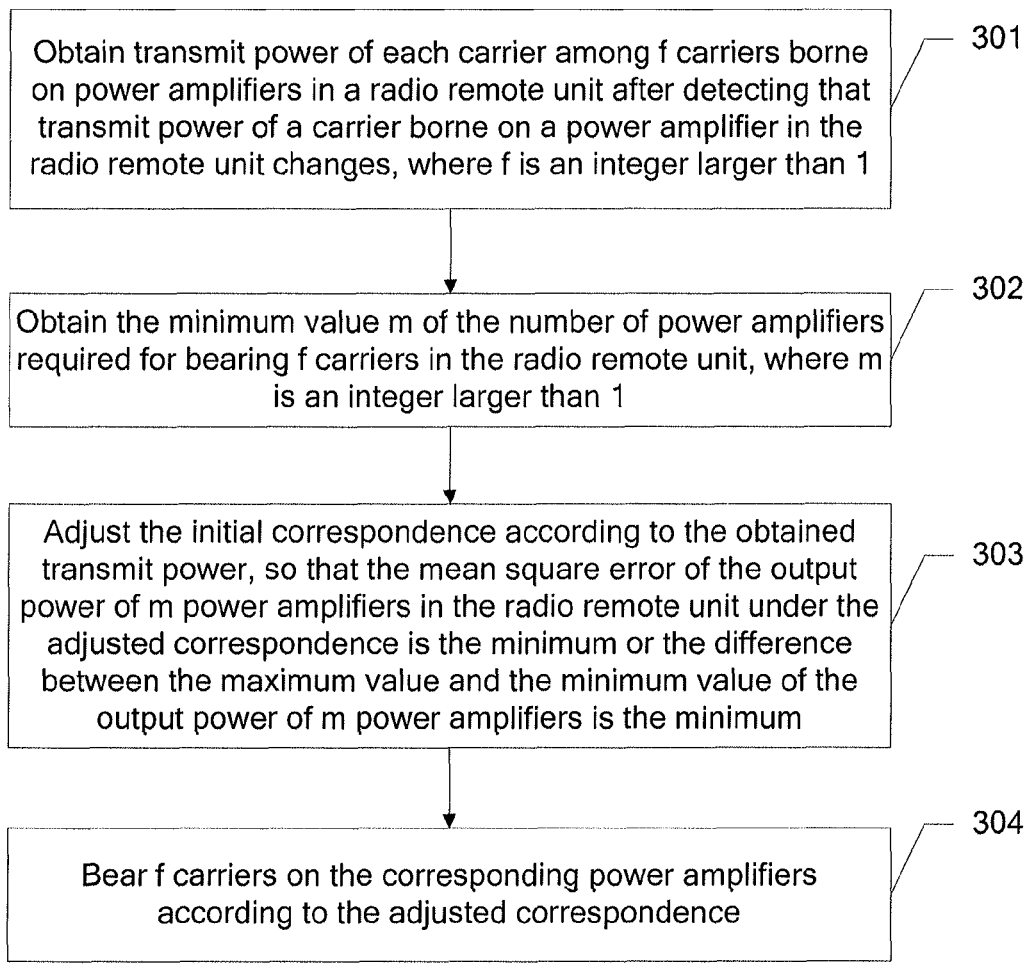
FIG. 3 is a flowchart of a carrier bearing method according to a third embodiment of the present disclosure.

Referring to FIG. 3, a flowchart of a carrier bearing method according to a third embodiment of the present disclosure is illustrated.

The carrier bearing method according to the third embodiment of the present disclosure includes:

301. Obtain transmit power of each carrier among f carriers borne on power amplifiers in a radio remote unit after detecting that transmit power of a carrier borne on a power amplifier in the radio remote unit changes, where f is an integer larger than 1.

Specifically, the total number of carriers required to be borne on the power amplifiers is f, where f is an integer larger than 1. A carrier bearing device obtains the transmit power of each carrier after detecting that the transmit power of a carrier changes.

302. Obtain the minimum value m of the number of power amplifiers required for bearing f carriers in the radio remote unit, where m is an integer larger than 1.

Specifically, the carrier bearing device may obtain the minimum value m of the number of power amplifiers required for bearing f carriers, according to the sum of the air interface transmit power required by each carrier, the maximum output power of each of p power amplifiers, and the maximum number of carriers on each power amplifier, where m is an integer larger than 1. In the embodiment of the present disclosure, the number of power amplifiers used is reduced as much as possible, so as to further improve the average efficiency of the power amplifier.

303. Adjust the correspondence according to the obtained transmit power, so that the mean square error of the output power of m power amplifiers in the radio remote unit under the adjusted correspondence is the minimum or the difference between the maximum value and the minimum value of the output power of m power amplifiers is the minimum.

The carrier bearing device may adjust the correspondence according to the obtained transmit power, so that the output power of m power amplifiers under the adjusted correspondence is approximate, that is, the power of f carriers is averagely allocated to m power amplifiers for bearing.

Specifically, when the carrier bearing device adjusts the correspondence, the mean square error of the output power of m power amplifiers under the correspondence between the carriers and the power amplifier (the correspondence when the output power of the power amplifiers is approximate) is the minimum, or the difference between the maximum value and the minimum value of the output power of m power amplifiers is the minimum. According to the embodiment of the present disclosure, a correspondence that satisfies a requirement may be obtained according to the above two determining criteria. It should be noted that in the embodiment of the present disclosure, other determining criteria may also be used to obtain a correspondence under which the output power of the power amplifiers is approximate.

304. Bear f carriers on the corresponding power amplifiers according to the adjusted correspondence.

The execution process of step 304 is the same as that of step 203 in the second embodiment, and details are not described herein.

The efficiency curve of a power amplifier is generally sub-linear (sub-linear). When the efficiency of the power amplifier increases, the output power of the power amplifier is not linear, that is, if the output power of the power amplifier increases twice, the efficiency of the power amplifier generally increases less than twice. Therefore, the power is allocated averagely as much as possible to multiple power amplifiers, to ensure the highest average efficiency.

In the carrier bearing method provided in the third embodiment of the present disclosure, a correspondence between the carriers and the power amplifier when the output power required by m power amplifiers is approximate is obtained. Under the obtained correspondence, the total input power required by the power amplifiers in the radio remote unit is the minimum. Compared with the prior art where only one correspondence can be used, a proper correspondence can be obtained according to the transmit power of multiple carriers required to be borne in the present disclosure, so that a proper power amplifier is flexibly selected for bearing carriers, according to the change of the power of the carriers. In this way, the required total input power is the minimum and the average work efficiency of the power amplifier is high.

It should be noted that, the second and third embodiments provide only two methods for obtaining the correspondence between the carriers and the power amplifier when the total input power required by p power amplifiers is the minimum. Those skilled in the art may use other methods to obtain the correspondence.

To better understand the embodiment of the present disclosure, the following provides a specific application scenario where the carrier bearing method provided in the embodiment of the present disclosure is used.

In this application scenario, for example, in a GSM system with four carriers and two power amplifiers, the number of carriers required to be borne is 4. An RRU includes two power amplifiers, that is, power amplifier 1 and power amplifier 2.

Figure 4:
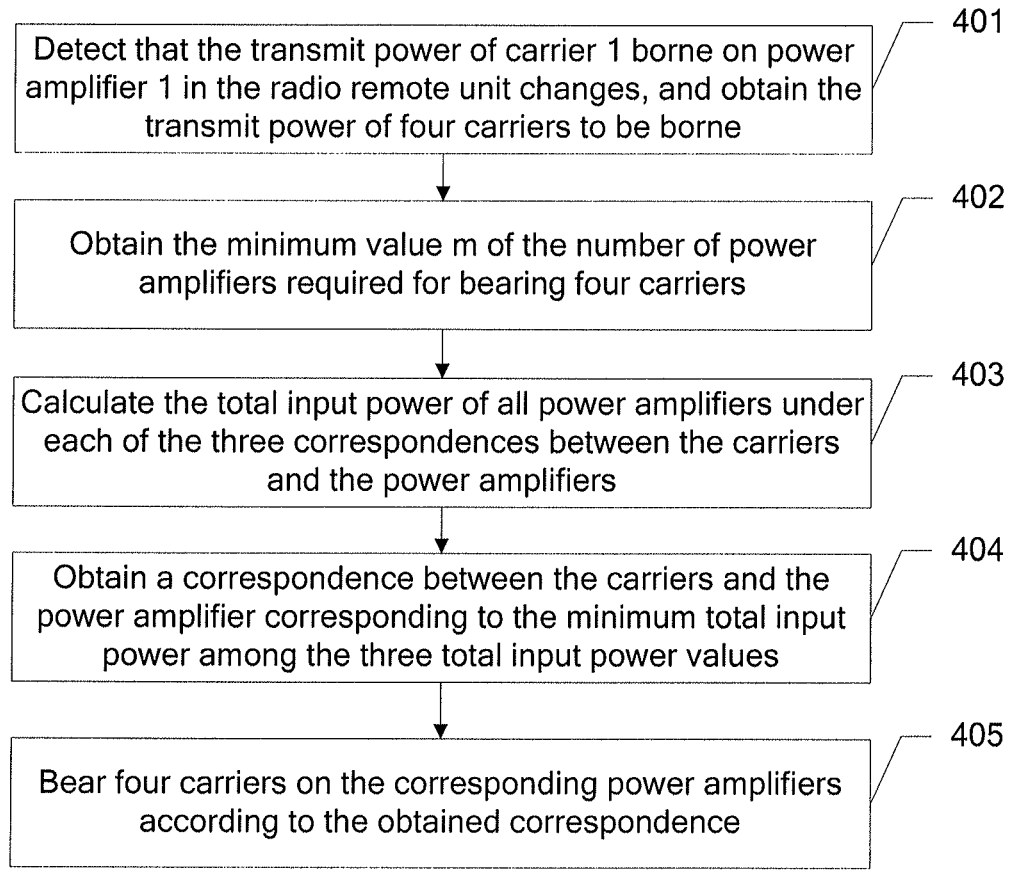
FIG. 4 is a flowchart of a carrier bearing method according to a fourth embodiment of the present disclosure.

Referring to FIG. 4, a flowchart of a carrier bearing method according to a fourth embodiment of the present disclosure is illustrated.

The carrier bearing method according to the fourth embodiment of the present disclosure includes the following steps:

401. Detect that the transmit power of carrier 1 borne on power amplifier 1 in the radio remote unit changes, and obtain the transmit power of four carriers required to be borne.

The transmit power of carrier 1 borne on power amplifier 1 changes from 8 W to 15 W, and the transmit power of four carriers that is obtained by a carrier bearing device is 15 W, 3 W, 5 W, and 0 W. A correspondence in the radio remote unit is that carriers 1 and 2 correspond to power amplifier 1 and carriers 3 and 4 correspond to power amplifier 2.

402. Obtain the minimum value m of the number of power amplifiers required for bearing four carriers.

The maximum number of carriers borne on each power amplifier is 2, and the minimum value m of the number of power amplifiers required for bearing four carriers is equal to 2. According to the minimum value of the number of power amplifiers, the number of correspondences between the carriers and the power amplifiers is reduced from 24=16 to C42=6.

In addition, in a GSM system, a main B carrier generally has a fixed correspondence with a certain power amplifier. In the embodiment of the present disclosure, the main B carrier (a carrier with the power of 15 W) has a fixed correspondence with power amplifier 1. Therefore, the number of correspondences between the carriers and the power amplifiers is reduced from six to three. Table 1 shows the correspondences.

TABLE 1

| No. | Power Amplifier 1 | Power Amplifier 2 |
|---|---|---|
| 1 | 15 W, 3 W | 5 W, 0 W |
| 2 | 15 W, 5 W | 3 W, 0 W |
| 3 | 15 W, 0 W | 5 W, 3 W |

403. Calculate the total input power of all power amplifiers under each of the above three correspondences between the carriers and the power amplifiers.

Figure 5:
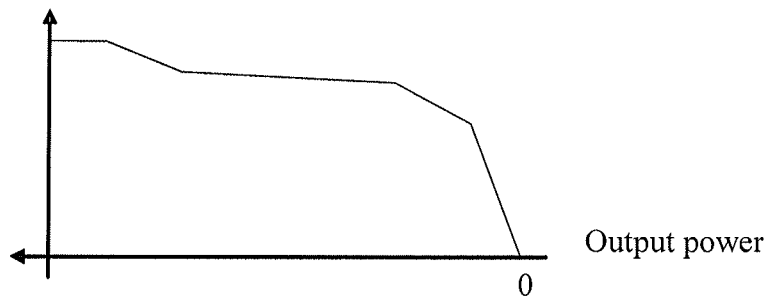
FIG. 5 is an efficiency curve of a power amplifier according to an embodiment of the present disclosure.

In the embodiment of the present disclosure, the efficiency curves of power amplifier 1 and power amplifier 2 are shown in FIG. 5. According to the efficiency curves, the calculated total input power under the No. 1 correspondence (initial correspondence) is 83.10+59.23=142.3 W; the calculated total input power under the No. 2 correspondence is 88.14+70.91=159 W; the calculated total input power under the No. 3 correspondence is 75.85+60.46=136.3 W.

404. Obtain a correspondence corresponding to the minimum total input power value among the three total input power values.

In the embodiment of the present disclosure, the total input power under the No. 3 correspondence is the minimum, and the carrier bearing device obtains the No. 3 correspondence.

405. Bear four carriers on the corresponding power amplifiers according to the obtained correspondence.

Specifically, the carrier bearing device bears the carrier with the power of 15 W and the carrier with the power of 0 W on power amplifier 1 and bears the carrier with the power of 5 W and the carrier with the power of 3 W on power amplifier 2.

In the embodiment of the present disclosure, if the maximum number of carriers that can be borne on a power amplifier is 3, a correspondence is added when step 403 is performed in the embodiment of the present disclosure. That is, the carrier with the power of 15 W, the carrier with the power of 3 W, and the carrier with the power of 5 W are borne on power amplifier 1, and the carrier with the power of 0 W is borne on power amplifier 2. According to the efficiency curves of the power amplifiers, the calculated total input power under the correspondence is 99.67 W, which is smaller than the total input power 136.3 W under the No. 3 correspondence. According to the embodiment of the present disclosure, the carrier with the power of 15 W, the carrier with the power of 3 W, and the carrier with the power of 5 W are borne on power amplifier 1, and the carrier with the power of 0 W is borne on power amplifier 2, so as to achieve the highest work efficiency.

Further, according to the embodiment of the present disclosure, a timeslot shutdown technology may also be applied to a power amplifier having the power of 0 W, to reduce static power consumption.

The following describes another application scenario where the carrier bearing method is used according to an embodiment of the present disclosure. In this application scenario, for example, in a GSM system with six carriers and two power amplifiers, the number of carriers required to be borne is 6. An RRU includes two power amplifiers, that is, power amplifier 1 and power amplifier 2.

Figure 6:
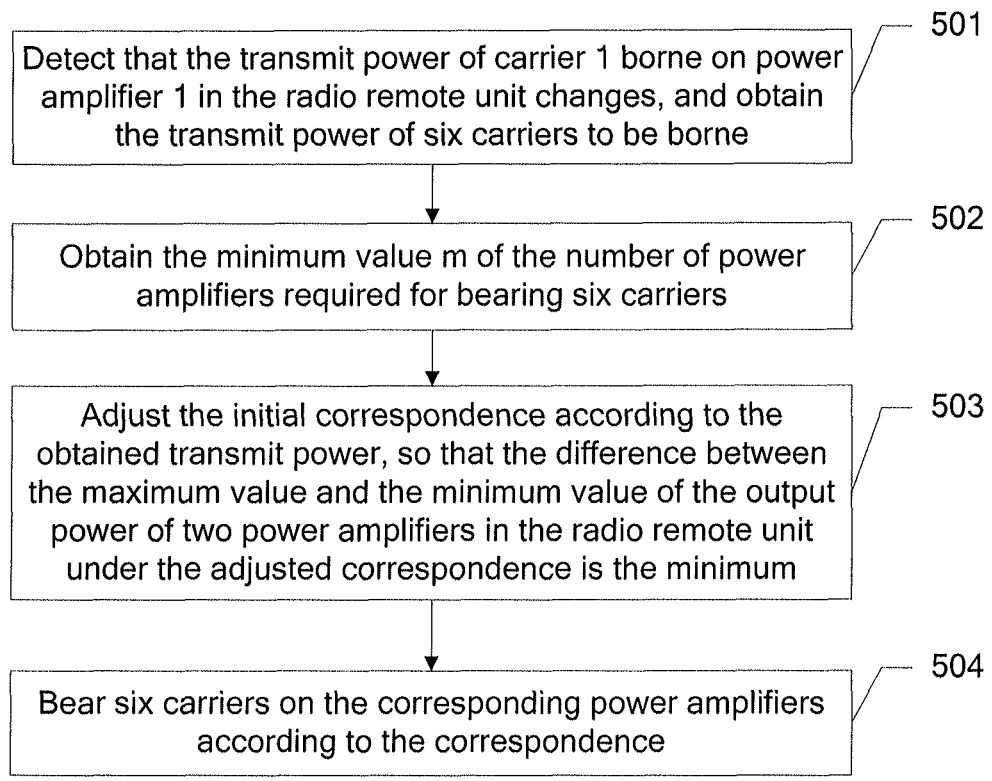
FIG. 6 is a flowchart of a carrier bearing method according to a fifth embodiment of the present disclosure.

Referring to FIG. 6, a flowchart of a carrier bearing method according to a fifth embodiment of the present disclosure is illustrated.

The carrier bearing method according to the fifth embodiment of the present disclosure includes the following steps:

501. Detect that the transmit power of carrier 1 borne on power amplifier 1 in a radio remote unit changes, and obtain the transmit power of six carriers required to be borne.

The transmit power of carrier 1 borne on power amplifier 1 changes from 8 W to 15 W, and the transmit power of six carriers that is obtained by a carrier bearing device is 15 W, 10 W, 5 W, 3 W, 2 W, and 0 W. An initial correspondence in the radio remote unit is that carriers 1, 2, and 3 correspond to power amplifier 1 and carriers 4, 5, and 6 correspond to power amplifier 2.

502. Obtain the minimum value m of the number of power amplifiers required for bearing six carriers.

Specifically, in the embodiment of the present disclosure, the maximum number of carriers that can be borne on each power amplifier is 4. Therefore, the minimum value m of the number of power amplifiers required for bearing six carriers is 2.

503. Adjust a correspondence according to the obtained transmit power, to make the difference between the maximum value and the minimum value of the output power of two power amplifiers in the radio remote unit under the adjusted correspondence to be the minimum.

In the embodiment of the present disclosure, according to the principle that power is allocating averagely as much as possible to power amplifiers, the initial correspondence is adjusted to a correspondence between the carriers and the power amplifier under which the input power required by two power amplifiers is approximate. The difference between the maximum value and the minimum value of the output power of two power amplifiers that is corresponding to the correspondence between the carriers and the power amplifier (a correspondence under which the input power of the power amplifiers is approximate) is the minimum. It should be noted that the carrier bearing device may also obtain a correspondence under which the mean square error of the input power of two power amplifiers is the minimum.

In addition, in the embodiment of the present disclosure, the position of the main B carrier with the power of 15 W is limited, and the carrier is fixedly matched to power amplifier 1.

Specifically, in the embodiment of the present disclosure, a required correspondence may be obtained by sorting in descending order. That is, the main B carrier corresponds to power amplifier 1, the carrier with the power of 10 W corresponds to power amplifier 2, the carrier with the power of 5 W corresponds to power amplifier 2, the carrier with the power of 3 W corresponds to power amplifier 1, the carrier with the power of 2 W corresponds to power amplifier 2, and so on. The power required to be borne on power amplifier 1 is 15+3=18 W, and the power required to be borne on power amplifier 2 is 10+5+2=17 W. The difference between the power required to be borne on power amplifier 1 and the power required to be borne on power amplifier 2 is 1, and is the minimum as compared with other correspondences.

504. Bear six carriers on the corresponding power amplifiers according to the correspondence.

Specifically, the carrier bearing device bears the main B carrier on power amplifier 1, the carrier with the power of 10 W on power amplifier 2, the carrier with the power of 5 W on power amplifier 2, the carrier with the power of 3 W on power amplifier 1, and the carrier with the power of 2 W on power amplifier 2, so as to achieve the highest power amplifier efficiency.

The above describes the carrier bearing method provided in the embodiments of the present disclosure in detail. The embodiments of the present disclosure also provide a carrier bearing device corresponding to the method embodiments. The device may be arranged in a base station in each mode, and is configured to adjust a correspondence between carriers and power amplifier; or may be arranged in a radio remote unit. When the base station has a radio remote unit, a power amplifier may be configured in the radio remote unit. The implementation of the method in the device and the base station embodiments is described above. The device and the base station may implement the above method. Therefore, the processes described in the method are also processing procedures for the device.

Figure 7:
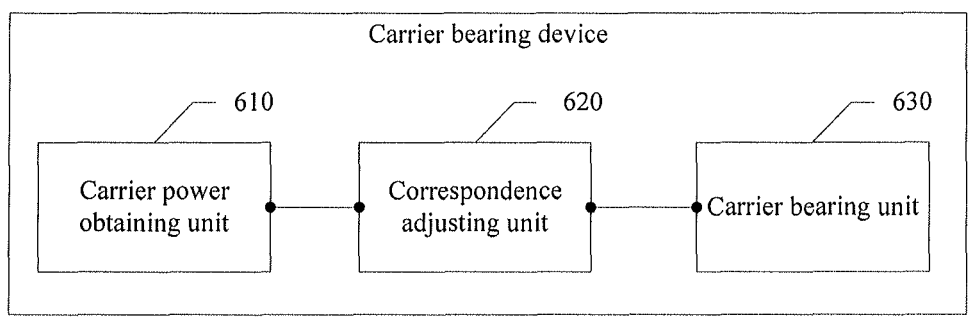
FIG. 7 is a schematic structural diagram of a carrier bearing device according to a sixth embodiment of the present disclosure.

Referring to FIG. 7, a schematic structural diagram of a carrier bearing device according to a sixth embodiment of the present disclosure is illustrated.

The carrier bearing device according to the sixth embodiment of the present disclosure may include:

a carrier power obtaining unit 610, configured to obtain transmit power of each carrier borne on power amplifiers in a radio remote unit after detecting that transmit power of a carrier borne on a power amplifier in the radio remote unit changes;

a correspondence adjusting unit 620, configured to adjust a correspondence between the carriers and the power amplifier in the radio remote unit according to the obtained transmit power; and a carrier bearing unit 630, configured to bear each carrier on its corresponding power amplifier according to the adjusted correspondence.

The carrier bearing device provided in the sixth embodiment of the present disclosure may be applied in the first embodiment illustrating the carrier bearing method. For details, reference can be made to the description of the first embodiment.

According to the carrier bearing device provided in the embodiment of the present disclosure, when the transmit power of a carrier changes, the correspondence adjusting unit 620 adjusts the correspondence in the radio remote unit according to the changed transmit power. Compared with the prior art where only one correspondence can be used, an initial correspondence can be adjusted according to the change of the transmit power of a carrier in the present disclosure to obtain a proper correspondence between a power amplifier and carriers. In this way, a proper power amplifier may be flexibly selected for bearing, according to the change of the transmit power of the carrier, and the average work efficiency of the power amplifier is improved.

Figure 8:
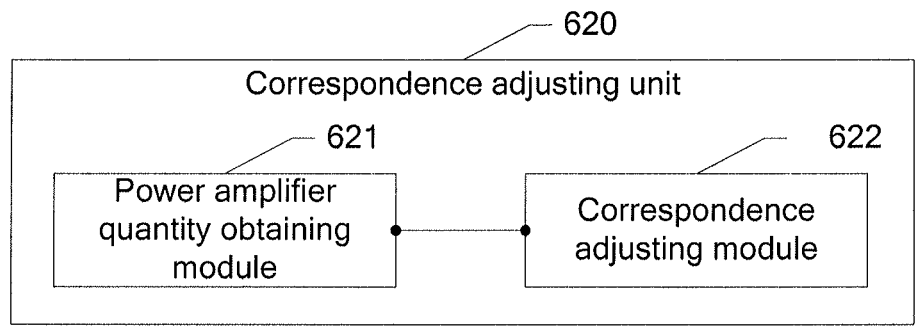
FIG. 8 is a schematic structural diagram of an embodiment illustrating a correspondence adjusting unit in a carrier bearing device according to an embodiment of the present disclosure.

Referring to FIG. 8, a schematic structural diagram of a correspondence adjusting unit in the carrier bearing device according to an embodiment of the present disclosure is illustrated.

In the carrier bearing device provided in the sixth embodiment of the present disclosure, the correspondence adjusting unit 620 includes:

a power amplifier quantity obtaining module 621, configured to obtain the minimum value m of the number of power amplifiers required for bearing f carriers, where m is an integer larger than 1, f is the total number of carriers borne on all power amplifiers in the radio remote unit, and f is an integer larger than 1; and a correspondence adjusting module 622, configured to adjust the correspondence according to the obtained transmit power, so that the mean square error of the output power of m power amplifiers in the radio remote unit under the adjusted correspondence is the minimum or the difference between the maximum value and the minimum value of the output power of m power amplifiers is the minimum.

In this embodiment of the present disclosure, the correspondence adjusting module 622 adjusts the correspondence, so that the output power required by m power amplifiers is approximate. The adjusted correspondence may make the total input power required by the power amplifiers in the radio remote unit to be the minimum, so as to maximize the average efficiency of the power amplifiers.

Figure 9:
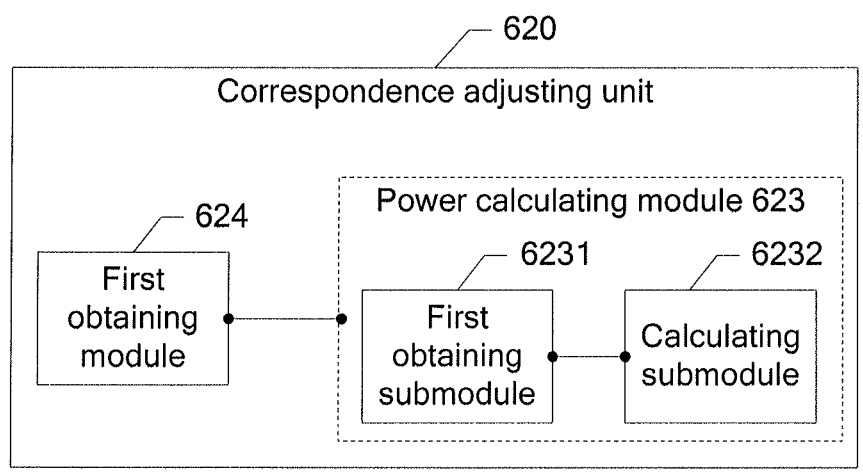
FIG. 9 is a schematic structural diagram of an embodiment illustrating a correspondence adjusting unit in a carrier bearing device according to another embodiment of the present disclosure.

Referring to FIG. 9, a schematic structural diagram of a correspondence adjusting unit in the carrier bearing device according to another embodiment of the present disclosure is illustrated.

In the carrier bearing device provided in the sixth embodiment of the present disclosure, the correspondence adjusting unit 620 may specifically include:

a power calculating module 623, configured to calculate the total input power of all power amplifiers under each of n correspondences between the carriers and the power amplifiers according to the obtained transmit power, where n is an integer smaller than or equal to $p^f$, p is the total number of power amplifiers in the radio remote unit, and is an integer larger than 1, and f is the number of carriers borne on all power amplifiers in the radio remote unit and is an integer larger than 1; and a first obtaining module 624, configured to obtain a correspondence that is between the carriers and the power amplifier and is corresponding to the minimum total input power value among n total input power values, where the correspondence between the carriers and the power amplifier is the adjusted correspondence.

The power calculating module 623 may further include:
a first obtaining submodule 6231, configured to obtain the minimum value m of the number of power amplifiers required for bearing f carriers in the radio remote unit, where f is the total number of carriers borne on all power amplifiers in the radio remote unit, and f is an integer larger than 1; and
a calculating submodule 6232, configured to calculate the total input power of all power amplifiers under each of $m^f$ correspondences between the carriers and the power amplifiers.

The obtaining, by the first obtaining module 624 in the carrier bearing device, the correspondence that is between the carriers and the power amplifier and is corresponding to the minimum total input power value among n total input power values may specifically include:
obtaining, by the first obtaining module 624, a correspondence that is between the carriers and the power amplifier and is corresponding to the minimum total input power value among $m^f$ total input power values.

In this embodiment of the present disclosure, by obtaining the minimum value m of the number of required power amplifiers, the first obtaining submodule 6231 can simplify the complexity of calculating the total input power of the power amplifiers by the calculating submodule 6232, reduce the implementation complexity of the power calculating module 623 and the first obtaining module 624, so as to further improve the work efficiency of the power amplifiers.

Figure 10:
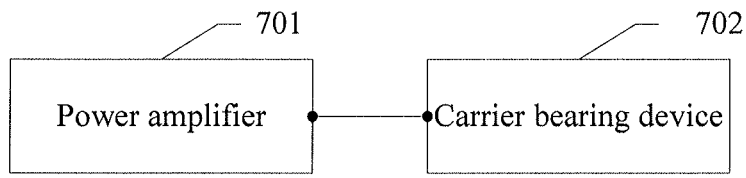
FIG. 10 is a schematic structural diagram of a base station according to a seventh embodiment of the present disclosure.

Referring to FIG. 10, a schematic structural diagram of a base station according to a seventh embodiment of the present disclosure is illustrated.

An embodiment of the present disclosure further provides a base station, including power amplifiers 701 and a carrier bearing device 702.

The power amplifiers 701 are configured to bear carriers and perform power amplification for the borne carriers. The carrier bearing device 702 is configured to obtain the transmit power of each of the carriers borne on the power amplifiers after detecting that the transmit power of a carrier borne on a power amplifier changes; adjust a correspondence between the carriers and the power amplifier according to the obtained transmit power; and bear each carrier on its corresponding power amplifier according to the adjusted correspondence.

The carrier bearing device, which is the same as that provided in the sixth embodiment, is configured to adjust the correspondence between carriers and a power amplifier 701. For details, reference can be made to the sixth embodiment, and no repeated description is provided herein.

It should be noted that the information interaction and execution process between the carrier bearing device and each unit of the base station are based on the same concept as the method embodiments of the present disclosure, so for details, reference can be made to the description of the method embodiments of the present disclosure, and no repeated description is provided herein.

Persons of ordinary skill in the art may understand that all or part of the steps of the methods according to the embodiments may be implemented by a computer program instructing relevant hardware. The program may be stored in a computer readable storage medium, and when the program runs, the processes in each method embodiment above may be included. The storage medium may be a magnetic disk, a CD-ROM, a read-only memory (Read-Only Memory, ROM), or a random access memory (Random Access Memory, RAM).

The above describes the carrier bearing method and device, and the base station provided in the embodiments of the present disclosure in detail. Persons of ordinary skills in the art can make modifications or variations to the specific embodiments and application scope without departing from the idea of the embodiments of the present disclosure. The specification is not intended to limit the present disclosure.

What is claimed is:

1. A carrier bearing method, comprising:
    obtaining, by a radio remote unit (RRU) which is within a base station in a radio communication system, transmit power of each carrier borne on all power amplifiers in the RRU;
    adjusting, by the RRU, a correspondence between the carriers and the power amplifier according to the obtained transmit power, wherein the adjusting of the correspondence between the carriers and the power amplifier according to the obtained transmit power comprises:
        adjusting the correspondence according to the obtained transmit power, so that total input power required by all the power amplifiers in the radio remote unit under the adjusted correspondence is smaller than the total input power required by all the power amplifiers under the correspondence; and
    bearing, by the RRU, each carrier on a corresponding power amplifier according to the adjusted correspondence.

2. The method according to claim 1, wherein adjusting the correspondence between the carriers and the power amplifier according to the obtained transmit power comprises:
    adjusting the correspondence according to the obtained transmit power to make total input power required by all the power amplifiers in the radio remote unit under the adjusted correspondence to be minimum.

3. The method according to claim 2, wherein the number of carriers borne on all the power amplifiers in the radio remote unit is f, wherein f is an integer larger than 1; and
    adjusting the correspondence according to the obtained transmit power comprises:
    calculating the total input power of all the power amplifiers under each of n correspondences between the carriers and the power amplifiers, wherein n is an integer smaller than or equal to pf, and p is the total number of power amplifiers in the radio remote unit and is an integer larger than 1; and
    obtaining a correspondence that is between the carriers and the power amplifier and is corresponding to a minimum total input power among n total input power values, wherein the correspondence between the carriers and the power amplifier is the adjusted correspondence.

4. The method according to claim 3, wherein calculating the total input power of all the power amplifiers under each of n correspondences between the carriers and the power amplifiers comprises:
    obtaining a minimum value m of the number of power amplifiers required for bearing the f carriers in the radio remote unit; and
    calculating the total input power of all the power amplifiers under each of mf correspondences between the carriers and the power amplifiers;
    the obtaining the correspondence that is between the carriers and the power amplifier and is corresponding to the minimum total input power value among the n total input power values comprises:

obtaining a correspondence that is between the carriers and the power amplifier and is corresponding to a minimum total input power value among mf total input power values.

5. The method according to claim 2, wherein the number of carriers borne on the power amplifiers in the radio remote unit is f, wherein f is an integer larger than 1; and
adjusting the correspondence according to the obtained transmit power comprises:
obtaining a minimum value m of the number of power amplifiers required for bearing the f carriers in the radio remote unit, wherein m is an integer larger than 1; and
adjusting the correspondence according to the obtained transmit power, so that a mean square error of output power of m power amplifiers in the radio remote unit under the adjusted correspondence is minimum or a difference between a maximum value and a minimum value of output power of m power amplifiers is minimum.

6. The method according to claim 5, wherein obtaining the minimum value m of the number of power amplifiers required for bearing the f carriers comprises:
obtaining the minimum number m of the power amplifiers required for bearing the f carriers, according to maximum output power of each power amplifier or the maximum number of carriers on each power amplifier in the radio remote unit.

7. A carrier bearing device, comprising:
the carrier bearing device being within a base station, and the carrier bearing device comprises:
a carrier power obtaining unit, configured to obtain transmit power of each carrier borne on power amplifiers in a radio remote unit;
a correspondence adjusting unit, configured to adjust a correspondence between the carriers and the power amplifier in the radio remote unit according to the obtained transmit power, wherein the correspondence adjusting unit comprises:
a power calculating module, configured to calculate total input power of all power amplifiers under each of n correspondences between the carriers and the power amplifiers according to the obtained transmit power, wherein n is an integer smaller than or equal to pf, p is the total number of power amplifiers in the radio remote unit and is an integer larger than 1, and f is the number of carriers on all the power amplifiers in the radio remote unit and is an integer larger than 1; and
a first obtaining module, configured to obtain a correspondence that is between the carriers and the power amplifier and is corresponding to a minimum total input power value among n total input power values, wherein the correspondence between the carriers and the power amplifier is the adjusted correspondence; and
a carrier bearing unit, configured to bear each carrier on its corresponding power amplifier according to the adjusted correspondence.

8. The carrier bearing device according to claim 7, wherein the power calculating module comprises:

a first obtaining submodule, configured to obtain a minimum value m of the number of power amplifiers required for bearing the f carriers in the radio remote unit, wherein f is the total number of carriers borne on all the power amplifiers in the radio remote unit and is an integer larger than 1; and
a calculating submodule, configured to calculate total input power of all the power amplifiers under each of mf correspondences between the carriers and the power amplifiers;
wherein the obtaining, by the first obtaining module, the correspondence that is between the carriers and the power amplifier and is corresponding to the minimum total input power value among the n total input power values comprises:
obtaining, by the first obtaining module, a correspondence that is between the carriers and the power amplifier and is corresponding to a minimum total input power value among mf total input power values.

9. The carrier bearing device according to claim 7, wherein the correspondence adjusting unit comprises:
a power amplifier quantity obtaining module, configured to obtain a minimum value m of the number of power amplifiers required for bearing f carriers, wherein m is an integer larger than 1, and f is the total number of carriers borne on all power amplifiers in the radio remote unit and is an integer larger than 1; and
a correspondence adjusting module, configured to adjust the correspondence according to the obtained transmit power to makes a mean square error of output power of m power amplifiers in the radio remote unit under the adjusted correspondence is minimum or a difference between a maximum value and a minimum value of output power of m power amplifiers to be minimum.

10. A base station, comprising:
power amplifiers, configured to bear carriers and perform power amplification for the borne carriers; and
a carrier bearing device comprising:
a carrier power obtaining unit, configured to obtain transmit power of each carrier borne on power amplifiers in a radio remote unit;
a correspondence adjusting unit, configured to adjust a correspondence between the carriers and the power amplifier in the radio remote unit according to the obtained transmit power, wherein the adjusting of the correspondence between the carriers and the power amplifier according to the obtained transmit power comprises:
adjusting the correspondence according to the obtained transmit power, so that total input power required by all the power amplifiers in the radio remote unit under the adjusted correspondence is smaller than the total input power required by all the power amplifiers under the correspondence; and
a carrier bearing unit, configured to bear each carrier on its corresponding power amplifier according to the adjusted correspondence.

* * * * *